(12) United States Patent
Wang

(10) Patent No.: US 11,578,628 B2
(45) Date of Patent: Feb. 14, 2023

(54) METHOD AND SYSTEM TO SELECTIVELY RECOVER WATER VAPOR AND LATENT HEAT FROM EXHAUST GAS STREAMS

(71) Applicant: GAS TECHNOLOGY INSTITUTE, Des Plaines, IL (US)

(72) Inventor: Dexin Wang, Long Grove, IL (US)

(73) Assignee: GAS TECHNOLOGY INSITUTE, Des Plaines, IL (US)

( * ) Notice: Subject to any disclaimer, the term of this patent is extended or adjusted under 35 U.S.C. 154(b) by 0 days.

(21) Appl. No.: 17/504,680

(22) Filed: Oct. 19, 2021

(65) Prior Publication Data

US 2022/0127983 A1 Apr. 28, 2022

Related U.S. Application Data

(60) Provisional application No. 63/104,597, filed on Oct. 23, 2020.

(51) Int. Cl.
*F01N 3/00* (2006.01)
*F01N 1/08* (2006.01)

(52) U.S. Cl.
CPC ............ *F01N 3/005* (2013.01); *F01N 1/082* (2013.01); *F01N 2240/22* (2013.01); *F01N 2570/22* (2013.01)

(58) Field of Classification Search
CPC ... F01N 3/005; F01N 2240/22; F01N 2570/22
See application file for complete search history.

(56) References Cited

U.S. PATENT DOCUMENTS

| | | | |
|---|---|---|---|
| 4,725,359 A * | 2/1988 | Ray | C02F 1/16 210/640 |
| 5,783,083 A | 7/1998 | Henshaw et al. | |
| 6,490,862 B1 * | 12/2002 | Beerlage | B01D 53/268 60/659 |
| 6,517,607 B2 | 2/2003 | Rabovitser et al. | |
| 7,066,396 B2 | 6/2006 | Knight et al. | |
| 8,425,656 B2 | 4/2013 | Clora, Jr. et al. | |

(Continued)

OTHER PUBLICATIONS

Wang, Dexin, "Transport Membrane Condenser for Water and Energy Recovery from Power Plant Flue Gas," Final Technical Report, Jun. 2012 (79 pages).

(Continued)

*Primary Examiner* — Jonathan R Matthias
(74) *Attorney, Agent, or Firm* — Pauley Erickson & Swanson

(57) ABSTRACT

An apparatus and method for recovering heat and water vapor from a waste gas stream. A waste gas passageway directs waste gas over a plurality of membrane tubes extending across the waste gas passageway. Each of the membrane tubes includes an internal passage separated from the waste gas passageway by a porous membrane. A water supply inlet manifold is connected to each of the plurality of membrane tubes, and configured to introduce water into the internal passages of the membrane tubes. A vacuum source is connected to the water side of the apparatus, and configured to adjust a pressure within the internal passages of the membrane tubes. The water within the internal passages receives heat and water vapor from the waste gas stream across the porous membrane.

16 Claims, 3 Drawing Sheets

(56) References Cited

U.S. PATENT DOCUMENTS

| | | |
|---|---|---|
| 2004/0149127 A1 | 8/2004 | Lyons et al. |
| 2009/0205500 A1 | 8/2009 | Oyama et al. |
| 2011/0247353 A1 | 10/2011 | Metz |
| 2016/0312676 A1* | 10/2016 | Youssef ............... F01N 3/0892 |
| 2018/0209670 A1* | 7/2018 | Feng ........................ F24F 3/14 |
| 2019/0091630 A1 | 3/2019 | Kyotani |
| 2020/0078737 A1* | 3/2020 | Bradford .............. B01D 63/066 |

OTHER PUBLICATIONS

Doty, Steve et al., "Energy Management Handbook," 8th Edition, The Fairmont Press, Inc., Lilburn, GA, © 2013, (pp. 219-223).

Bao, Ainan et al., "Nanoporous membrane tube condensing heat transfer enhancement study," International Journal of Heat and Mass Transfer, vol. 84, 2015 (pp. 456-462).

Wang, Dexin et al., "Coal power plant flue gas waste heat and water recovery," Applied Energy, vol. 91, Issue 1, 2012 (pp. 341-348).

Horsey, Mary, "Low-Temp. Heat Recovery Is Viable at Last," E Source Co. LLC, Jul. 2011 (pp. 1-5), URL: esource.com/members/TAS-RB-51/Research_Brief/TransportMembraneCondenser.

ISA/US, English language verison of the International Search Report, Form PCT/ISA/210, for International Application PCT/US2021/55750, dated Mar. 10, 2022 (4 pages).

ISA/US, Form PCT/ISA/237, Written Opinion of the International Searching Authority, for International Application PCT/US2021/55750, dated Mar. 10, 2022 (11 pages).

\* cited by examiner

METHOD AND SYSTEM TO SELECTIVELY RECOVER WATER VAPOR AND LATENT HEAT FROM EXHAUST GAS STREAMS

CROSS REFERENCE TO RELATED APPLICATION

This application claims the benefit of U.S. Provisional Patent Application Ser. No. 63/104,597, filed on 23 Oct. 2020. The co-pending provisional application is hereby incorporated by reference herein in its entirety and is made a part hereof, including but not limited to those portions which specifically appear hereinafter.

BACKGROUND OF THE INVENTION

This invention relates generally to a device for removing water vapor from gas streams and, more particularly, to a device and method for removing water vapor and heat from waste exhaust gas streams. Many waste gas streams from different processes contain at least a portion of water vapor in them. There is also often a significant amount of heat in these streams. In current water and heat recovery systems it is difficult to recover heat from the gas exhaust streams. When the temperature of a gas exhaust stream is lowered, usually by a heat exchanger, a buildup of water condensation occurs in the stream. The water condensation can cause corrosion on the heat exchanging equipment. The condensation buildup can also contaminate water that creates an additional waste stream requiring disposal.

Therefore, there is a need for a system and method to remove water vapor and recover heat from gas exhaust streams without water contamination or damaging parts of the heating system.

SUMMARY OF THE INVENTION

The invention generally relates to a water vapor separation membrane device for use with different waste gas streams. The general object of the invention can be attained, at least in part, through selectively removing water vapor from various waste exhaust gas streams with a membrane device.

The membrane device includes a membrane layer, such as embodied as a tube, preferably formed in a cylindrical shape. Multiple membrane layers or tubes are preferably assembled into a membrane module. The membrane module includes an inlet end and an outlet end for cooling water to flow though the inside of the membrane tubes. A water vapor laden exhaust gas can pass across the membrane module, on the outside of the membrane layer or tubes. The cooling water absorbs heat and combines with additional water passing through walls of the membrane layers. The water passing through the tubes can be recycled and used for other purposes. The membrane layers are selectively porous, allowing water vapor to cross the membrane layers, so that the water vapor and heat from exhaust gas may be harvested and used as feed water for various industrial uses.

Typical exhaust gas is at or near atmospheric pressure, and water vapor in the exhaust gas has difficulty passing across the membrane layers in a high enough flux at atmospheric pressure, the membrane device of embodiments of this invention also include a vacuum pump connected to a water side of the membranes to increase a pressure drop across the membrane layers. The higher pressure drop ensures an optimum amount of water vapor and heat can be harvested by passing through the membrane layers.

As a result of the membrane device, both heat and water are recovered from the exhaust streams, without leaving behind lingering water condensation. This prevents excess condensation from causing any problems with heat exchanging or any other type of associated components. The membrane device reduces or eliminates water vapor from the exhaust gas streams to avoid fumes forming in the atmosphere, while also minimizing acidic condensate formation. The resulting recovered water vapor is mineral-free, providing high quality water that can be used for many industrial processes while also increasing energy efficiency of steam generators and water heaters due to heat recovered by the membrane device.

Embodiments of this invention provide or include an apparatus for recovering heat and water vapor from a waste gas stream. The apparatus includes a waste gas passageway, through which a waste/exhaust gas can pass. A plurality of membrane tubes extend across the waste gas passageway. Each of the membrane tubes includes an internal passage separated from the waste gas passageway by a porous membrane. A water supply inlet manifold is connected to each of the plurality of membrane tubes, and configured to introduce water into the internal passage of the each of the plurality of membrane tubes. A vacuum source is connected (generally indirectly) to the plurality of membrane tubes, and configured to adjust a pressure within the internal passage of the each of the plurality of membrane tubes. Water flowing within the internal passages receives heat and water vapor from the waste gas stream across the porous membrane.

In embodiments of this invention, the porous membrane includes pores sized in a range of about 4 nm to about 20 nm. The pore size can vary for implementations depending on need, such as to achieve optimized water transfer flux and high separation ratio for different exhaust gas conditions. The porous membrane can also include an outer surface coating, such as to increase membrane surface area.

In embodiments of this invention, the membranes are formed of a nanoparticle ceramic material. An inner layer can be formed of an extrusion technique, with additional (e.g., smaller pore size) layers added as needed to obtain the desired pore structure. The additional layers can be applied by, for example, dip coating a ceramic nanoparticle material, and heating to remove solvents and form a pore structure. In embodiments of this invention, the membrane tubes have an outer diameter of about 5-6 mm, preferably about 5.5. mm, and an inner diameter of about 3-4 mm, preferable about 3.5 mm.

In embodiments of this invention, the coated membrane tubes are assembled together into a membrane module that includes a water inlet and an outlet. In embodiments of this invention 350-400 tubes, preferably about 386-390 tubes, are included in a module each about 15-20 inches long, preferably about 18 inches. In other embodiments of the invention, additional inlets/outlets may be present to connect the membrane module to additional water streams. The membrane module may also be used with other systems such as steam generators and other heating systems. The addition of the membrane module to the inlet and outlet water heaters allows the whole overall heating system to recover water vapor latent from waste gas streams and water vapor as pure water. Current heat recovery systems may include condensing heat exchangers that have anti-corrosion coatings so that the systems can recover water vapor from gas streams. However, such systems cannot recover water vapor in a liquid water state. This is because the water vapor would be condensed on a gas-side of the heat recovery system, which would contaminate the water vapor so that the water vapor could not be reused. Using the membrane module, heat transfer amongst heat recovery systems can be improved by allowing water vapor to carry heat across a membrane wall while retaining a liquid water mass.

In embodiments of this invention, the vacuum source includes a vacuum pump applied to a water side of the plurality of membrane tubes. In particular embodiments, it is desirable to provide or maintain water side pressure 3-8 psi below atmospheric pressure to achieve optimized performance, and particularly while using a lower capacity vacuum pump. Water level control inside a water source tank can be important to maintain a proper air space for generating the vacuum in embodiments of this invention.

The invention further includes an apparatus for recovering heat and water vapor from a waste gas stream with a plurality of transport membrane condensers, such as the modules describes above. Each of the transport membrane condensers includes a plurality of membrane tubes extending between a water supply inlet manifold and a water supply outlet manifold. Each of the membrane tubes includes a porous membrane about an internal passage configured to pass a water flow from the water supply inlet manifold to the water supply outlet manifold. A vacuum source is connected to the plurality of transport membrane condensers, and configured to adjust a pressure within the internal passage of each of the plurality of membrane tubes.

In embodiments of this invention, each of the transport membrane condensers further includes a frame connecting the water supply inlet manifold and the water supply outlet manifold. The frame encloses the plurality of membrane tubes, and the frame includes a waste gas passageway configured allow the waste gas stream to pass over the plurality of membrane tubes. The water flow within the internal passage again receives heat and water vapor from the waste gas stream across the porous membrane. A water supply outlet manifold of a first of the plurality of transport membrane condensers can be connected to a water supply inlet manifold of a second of the plurality of transport membrane condensers. The vacuum source can be upstream and/or downstream of the plurality of transport membrane condensers.

In embodiments of this invention, a water level control system is configured to control the vacuum source. A water supply header, such as a water tank, can be upstream of the water supply inlet manifold, and the vacuum source comprises a vacuum pump connected to the water supply header. The vacuum pump is controlled by the water level control system to maintain a predetermined air space within the water supply header. In embodiments of this invention, the vacuum source is or includes a water pump downstream of the water supply outlet manifold.

The invention further includes a method for recovering heat and water vapor from a waste gas stream, such as using any of the apparatuses described herein. The method includes the steps of: passing a cooling water flow through an internal passage of each of a plurality of membrane tubes; passing an exhaust gas over an outer surface of the each of a plurality of membrane tubes; and applying a vacuum pressure to the cooling water within the internal passage of each of a plurality of membrane tubes.

Other objects and advantages will be apparent to those skilled in the art from the following detailed description taken in conjunction with the appended claims and drawings.

DETAILED DESCRIPTION OF THE INVENTION

The present invention provides a system and method for recovering water and heat from waste exhaust gas streams. The system and method includes improved transport membrane condenser (TMC) technology so that pure water and heat energy can be recovered and re-used for industrial applications. The present invention can recover both water vapor latent heat and whole water in mineral-free form from various waste gas streams. The whole water is pure so that it can be used in further steps and processes for different steam generation and water heating systems. The invention avoids the need for condensate disposal and it also reduces or eliminates fume and acidic condensate formation from the exhaust gases.

Figure 1:
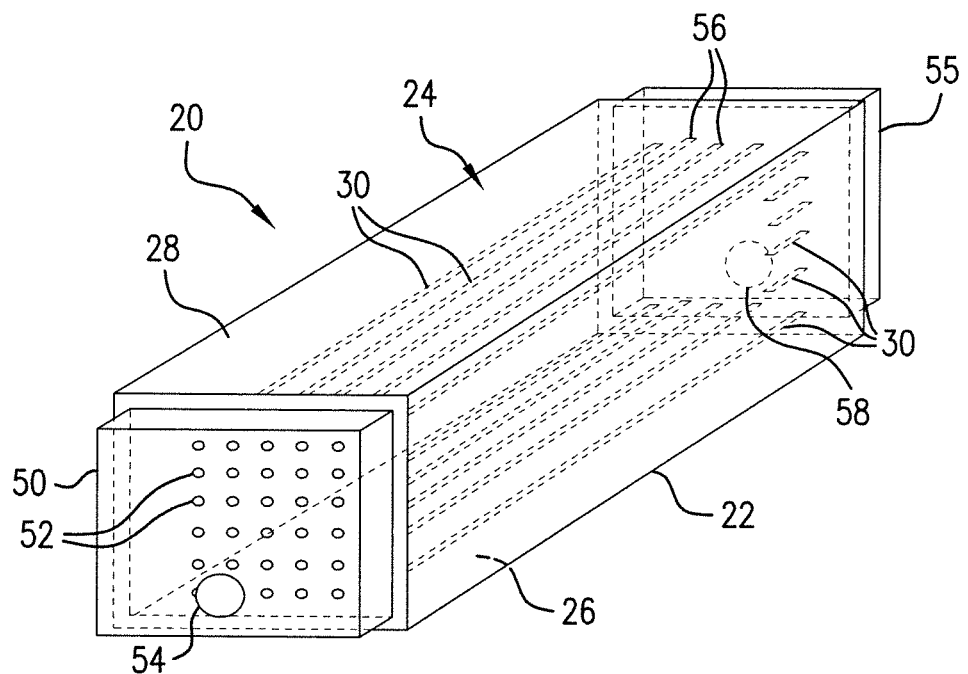
FIG. 1 shows a membrane tube module according to one embodiment of this invention.

FIG. 1 shows a membrane tube module 20 according to one embodiment of this invention. The module 20 includes a frame 22 that includes a central waste gas passageway 24. The frame 22 can be formed of various construction, such as using extension bars and/or have solid side panels, but module 20 is preferably open one at least two sides (e.g., bottom 26 and top 28) to allow the waste gas to pass through the module passageway 24.

The module 20 includes a plurality of membrane tubes 30 extending across the waste gas passageway 24 (only a portion of the total number of illustrated tubes, and less than the typical number of tubes used, is shown for clarity). Any suitable array of membrane tubes 30 is available for the module 20, depending on need. For example, different numbers or sizes of tubes 30 can be used, as well as different materials for the tubes. The tubes can also be the same or different. In embodiments of this invention, each module array includes over 300 tubes, preferably over 350 tubes, and desirably about 375-390 tubes, depending on need.

In embodiments of this invention, a spaced membrane tube design provides improved gas side heat/mass transfer, also allowing for a low gas side pressure drop. Preferred spacings between adjacent tubes 30 are between 0.5 cm and 1.5 cm, and more desirably about 0.8 cm to about 1.2 cm.

Figure 2:
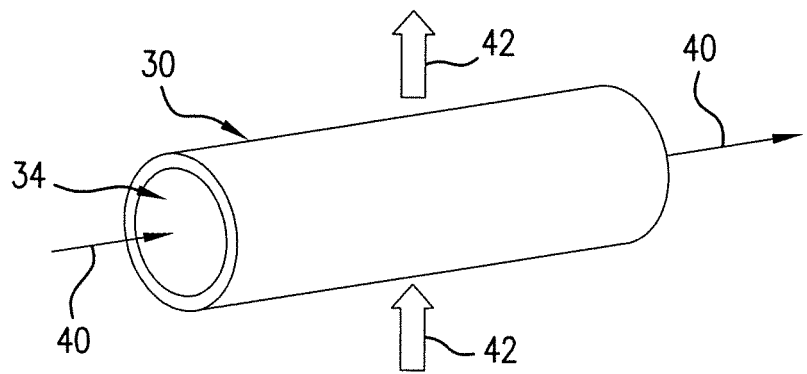
FIG. 2 shows a membrane tube section, such as included in FIG. 1.

As shown in FIG. 2, each of the membrane tubes 30 includes an internal passage separated from the waste gas passageway 34 by a porous membrane 32. A water flow 40 passes through the internal passage 34. The water flow 40 is maintained in the tubes 30 by the membrane 32, but heat and/or water vapor in the waste gas 42 can pass through the porous membrane 32. The water flow 40 receives the heat and water vapor from the waste gas 42, thereby removing these components from the waste gas 42.

Integrated water inlet/outlet chambers allow for a compact design and good water distribution among the different tubes in the module 20. As shown in FIG. 1, a water supply inlet manifold 50 connects to each of the plurality of membrane tubes 30 to introduce and divide the water flow 40, through manifold inlet openings 52, to the internal passages 34. The water flow 40 exits the internal passages 34 into water supply outlet manifold 55, via manifold outlet openings 56, which recombines the individual membrane tube water streams. Manifold 50 includes a water inlet 54 and manifold 55 includes a water outlet 58, each of which can be connected to upstream and downstream components by suitable tubing/plumbing.

In embodiments of this invention, the module components, such as the frame and manifolds are formed of engineered plastic part designs that provide for commercial scale and injection/compression molding fabrication, greatly lowering the module cost. Frame reinforced module designs allow for high mechanical strength.

Figure 3:
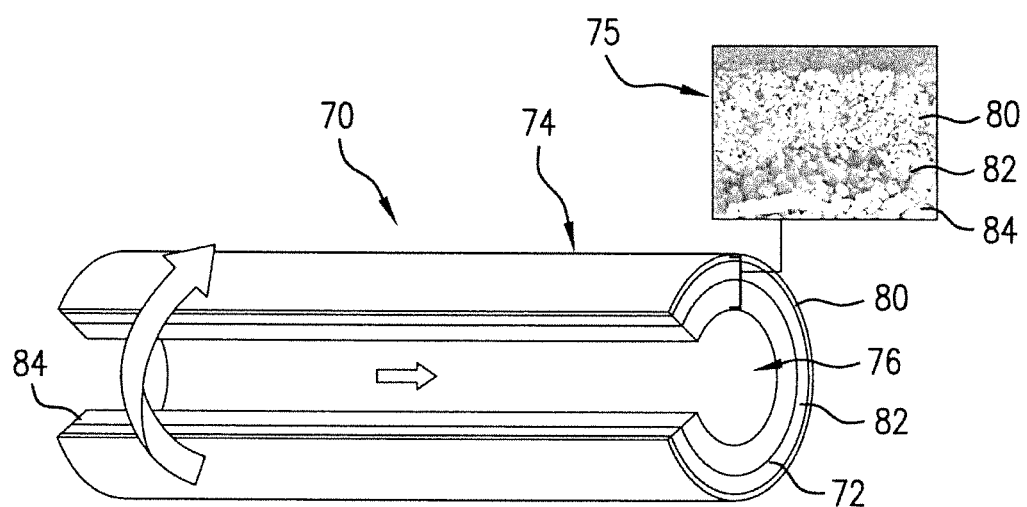
FIG. 3 is shows partial cross-sectional view of a membrane tube for a membrane device according to one embodiment of this invention.

FIG. 3 shows an exemplary membrane tube 70 according to embodiments of this invention. The membrane tube 70 includes a separation membrane layer 72 which is preferably coated on an outside substrate surface 74 of the membrane tube. A suitable coating material is alumina (AL2O3) and/or zirconium dioxide (ZrO2). The separation membrane layer 72 includes pores suitably sized to allow water molecules to pass through the layer, while other gas components are prevented from penetrating the tube 70. Water flows through the hollow interior passage 76 of the membrane tube 70. A water vapor laden exhaust gas passes outside the membrane tube as cooling water flows through the inside of the membrane tube. As the cooling water flows through the tube, the cooling water picks up heat and water that pass through the pores of the separation membrane layer of the tube 70.

In the embodiment of FIG. 3, the porous membrane 72 is formed of several sublayers, such as shown in the micrograph 75, each having a different material and/or pore size. In FIG. 2, an outer layer 80 has a pore size of 4-20 nanometers. The middle layer 82 has a pore size of 50 nm. An inner layer 84 has a pore size of about 400 nm. The multiple sublayers allows for a gradient pore size build, such as with the intermediate layer allowing for a smaller pore size outer layer to be applied to a larger pore size inner layer. As will be appreciated, various membrane materials and porosity are available, depending on need. In embodiments of this invention, the membrane pore size on the outer layer may range from 4 nm to 20 nm for different exhaust gas conditions to achieve optimized water transfer flux and high separation ratio.

Pressure levels may be modified in the membrane module in order to facilitate water molecules passing through the separation layer. However, as exhaust gas is commonly at or near atmospheric pressure, a higher pressure drop may be needed across a membrane wall. Therefore, a vacuum may be added to the system to generate negative pressure. The vacuum is present on the "water" side of the system as opposed to the "gas" side. The negative pressure generated by, for example, one or more vacuum pumps produces a pressure drop across the membrane layer resulting in a larger influx of water vapor into the tubes. To facilitate the vacuum generation in the water side of the system, water level control and other control strategies have been developed to allow the whole system to effectively generate negative pressure on the water side, allowing the system to operate continuously and automatically.

Figure 4:
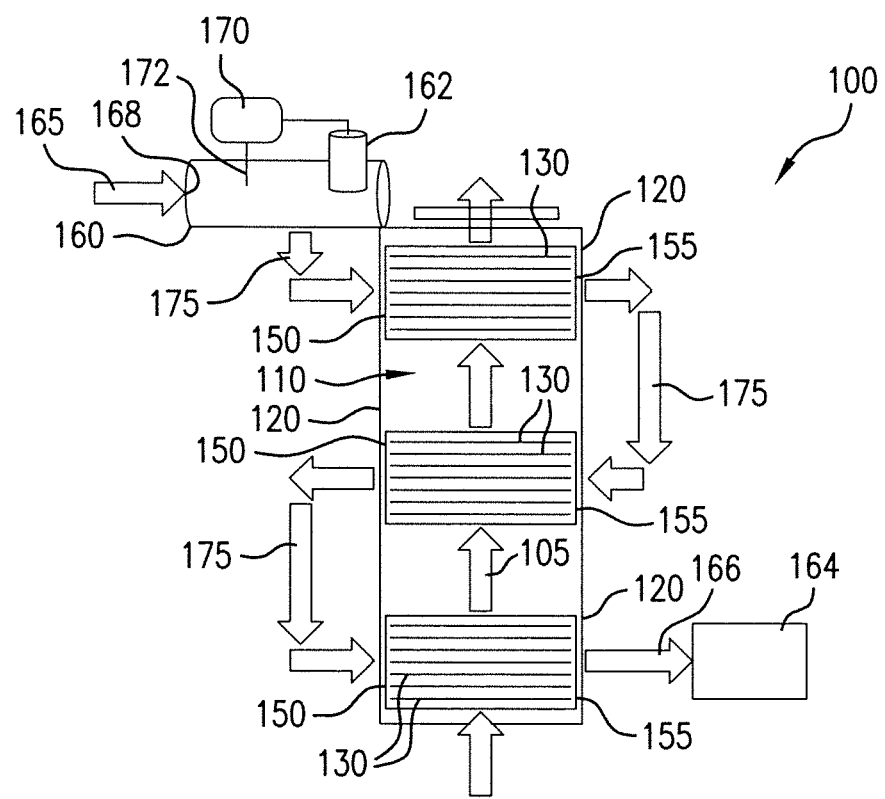
FIG. 4 shows a representative illustration of a heat recovery system including multiple membrane modules according to one embodiment of this invention.

FIG. 4 illustrates an apparatus 100 including multiple transport membrane condenser modules 120 for recovering heat and water vapor from a waste gas stream 105. The apparatus 100 includes a waste gas passageway 110. Three modules 120 are incorporated into the gas passageway 110, although any number and configuration of modules can be used, depending on need. The illustrated three-pass cross flow system design provides good heat and water recovery performance. This unit modular design allows for easier scaling up, by simply adding more modules for each module row (perpendicular to the gas stream flow 105) while still maintaining the three-pass design.

Each module 120 includes a plurality of membrane tubes 130 extending between a water supply inlet manifold 150 and a water supply outlet manifold 155. Each of the membrane tubes 130 includes a porous membrane about an internal passage configured, such as described above, to pass a water flow from the water supply inlet manifold 150 to the water supply outlet manifold 155. Each module 130 also includes a frame 122 connecting the water supply inlet manifold 150 and the water supply outlet manifold 155. The frame 122 enclosing the plurality of membrane tubes 130, and including a waste gas passageway 124 inline with the overall passageway 110.

The modules 120 are connected by water lines 175, formed of any suitable water tubing or piping (e.g., PVC tubing). As shown in FIG. 4, a water supply outlet manifold 155 of an upstream module 120 is connected to a water supply inlet manifold 150 of a downstream module 120. A water supply header 160 upstream of the first module 120 encloses a supply of water 165 for the system 100.

A vacuum source is preferably connected to the water side (internal) of the transport membrane condenser modules 120. The vacuum removes air and other gases (e.g., from the incoming water) and/or adjusts a pressure within the header 160 and/or the internal passages of each of the plurality of membrane tubes 130 to improve the heat and/or vapor transfer through the tubes 130. The vacuum source can be upstream, downstream, and/or midstream of the transport membrane condensers 120, depending on need and the size of the system. As shown in FIG. 4, a vacuum pump 162 is connected to the water supply header 160. The vacuum pump 162 is controlled by a water level control system 170, using water level sensor 172, to maintain a predetermined air space within the water supply header 160 for the vacuum operation. The water level control system 170 operates a valve 168 to open and close the water supply 165 to maintain the water level inside the header 160.

The vacuum source alternatively or additionally is or includes a water pump 164, illustrated as downstream of the last water supply outlet manifold 155. In embodiments of this invention, a low NPSH (net positive suction head) water pump is used at the apparatus water outlet 166, to provide the additional water side vacuum generation.

In embodiments of this invention, the vacuum source maintains a pressure of 3-8 psi below an atmospheric pressure for the water side of the of the plurality of membrane tubes. The water level control inside the water header can be important in maintaining a proper air space for generating the vacuum. In embodiments of this invention, a low gas side pressure drop design (e.g., a 2-5" water column) allows the system to use an existing exhaust gas pressure head. If the pressure head is not available, an induced draft fan can be used for the gas outlet to pull the gas through.

Use of the membranes according to this invention vastly improve water and heat retention compared to existing heat transfer surface materials, such as anti-corrosion stainless steels or coated carbon steels. Due to the significant heat and water recovery, as well as environmental benefits to achieve net-zero emissions, the invention provides a viable solution to the shortcomings of previous heat retention devices.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for recovering heat and water vapor from a waste gas stream, the apparatus comprising:
 a waste gas passageway;
 a plurality of membrane tubes extending across the waste gas passageway, each of the membrane tubes including an internal passage separated from the waste gas passageway by a porous membrane;
 a water supply inlet manifold connected to each of the plurality of membrane tubes, and configured to introduce water into the internal passage of the each of the plurality of membrane tubes; and
 a vacuum source connected to the plurality of membrane tubes, and configured to adjust a pressure within the internal passage of the each of the plurality of membrane tubes, wherein the vacuum source comprises a vacuum pump applied to an air space in a water supply header on a water side of the plurality of membrane tubes, wherein the vacuum pump is controlled by a water level control system to maintain a water level and a predetermined air space within the water supply header.

2. The apparatus of claim 1, wherein the water within the internal passage receives heat and water vapor from the waste gas stream across the porous membrane.

3. The apparatus of claim 1, wherein the porous membrane comprises an outer surface coating.

4. The apparatus of claim 1, wherein the porous membrane comprises pores sized in a range of about 4 nm to about 20 nm.

5. The apparatus of claim 1, further comprising a water supply outlet manifold connected to each of the plurality of membrane tubes on a side opposite the water supply inlet manifold, and configured to receive the water from the internal passage of the each of the plurality of membrane tubes.

6. The apparatus of claim 5, further comprising a frame connecting the water supply inlet manifold and the water supply outlet manifold, the frame enclosing the plurality of membrane tubes, wherein the frame is open at sides to allow the waste gas stream to pass over the plurality of membrane tubes.

7. The apparatus of claim 1, wherein the vacuum source comprises a water pump downstream of the water supply outlet manifold.

8. The apparatus of claim 1, wherein the vacuum source is configured to maintain a pressure of 3-8 psi below an atmospheric pressure for a water side of the plurality of membrane tubes.

9. The apparatus of claim 1, further comprising an induced draft fan for pulling and controlling the waste gas stream over an outer surface of the plurality of membrane tubes.

10. A method for recovering heat and water vapor from a waste gas stream using the apparatus of claim 1, the method comprising the steps of:
 passing a cooling water flow through the internal passage of each of the plurality of membrane tubes;
 passing an exhaust gas over an outer surface of the each of a plurality of membrane tubes;
 applying a vacuum pressure to the cooling water within the internal passage of each of a plurality of membrane tubes; and
 recovering the heat and the water vapor from the exhaust gas within the cooling water flow.

11. An apparatus for recovering heat and water vapor from a waste gas stream, the apparatus comprising:
 a plurality of transport membrane condensers, each of the transport membrane condensers including a plurality of membrane tubes extending between a water supply inlet manifold and a water supply outlet manifold, each of the membrane tubes including a porous membrane about an internal passage configured to pass a water flow from the water supply inlet manifold to the water supply outlet manifold; and
 a vacuum source connected to the plurality of transport membrane condensers, and configured to generate a vacuum on a water side of the porous membrane to adjust a pressure within the internal passage of each of the plurality of membrane tubes, wherein the vacuum source comprises a vacuum pump applied to an air space in a water supply header on a water side of the plurality of membrane tubes, wherein the vacuum pump is controlled by a water level control system to maintain a water level and a predetermined air space within the water supply header.

12. The apparatus of claim 11, wherein each of the transport membrane condensers further includes a frame connecting the water supply inlet manifold and the water supply outlet manifold, the frame enclosing the plurality of membrane tubes, wherein the frame includes a waste gas passageway configured allow the waste gas stream to pass over the plurality of membrane tubes, wherein the water flow within the internal passage receives heat and water vapor from the waste gas stream across the porous membrane.

13. The apparatus of claim 11, wherein a water supply outlet manifold of a first of the plurality of transport membrane condensers is connected to a water supply inlet manifold of a second of the plurality of transport membrane condensers.

14. The apparatus of claim 11, wherein the vacuum source is upstream or downstream of the plurality of transport membrane condensers.

15. The apparatus of claim 11, wherein the vacuum source comprises a water pump downstream of the water supply outlet manifold.

16. The apparatus of claim 11, wherein the vacuum source is configured to maintain a pressure of 3-8 psi below an atmospheric pressure for a water side of the of the plurality of membrane tubes.

* * * * *